(12) United States Patent
Smithwick (10) Patent No.: US 9,615,068 B2
(45) Date of Patent: Apr. 4, 2017

(54) OPTICAL VORTEX 3D DISPLAYS

(71) Applicant: DISNEY ENTERPRISES, INC., Burbank, CA (US)

(72) Inventor: Quinn Y. Smithwick, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 454 days.

(21) Appl. No.: 14/155,469

(22) Filed: Jan. 15, 2014

(65) Prior Publication Data
US 2015/0201186 A1 Jul. 16, 2015

(51) Int. Cl.
| | |
|---|---|
| G03B 21/00 | (2006.01) |
| G03H 1/08 | (2006.01) |
| G03H 1/22 | (2006.01) |
| H04N 9/31 | (2006.01) |
| G03H 1/26 | (2006.01) |
| H04N 13/04 | (2006.01) |

(52) U.S. Cl.
CPC ......... *H04N 9/3132* (2013.01); *G03B 21/005* (2013.01); *G03H 1/0808* (2013.01); *G03H 1/2205* (2013.01); *G03H 1/2294* (2013.01); *G03H 1/2645* (2013.01); *H04N 13/0459* (2013.01); *H04N 13/0488* (2013.01); *G03H 2001/261* (2013.01); *G03H 2210/33* (2013.01); *G03H 2223/54* (2013.01)

(58) Field of Classification Search
USPC ........................................................ 348/52
See application file for complete search history.

(56) References Cited

U.S. PATENT DOCUMENTS 6,603,504 B1 * 8/2003 Son ................... H04N 13/0404
348/54

OTHER PUBLICATIONS

Nickolay N. Evtikhiev ; Vladimir I. Bobrinev ; Nikolai A. Kostrov ; Oleg E. Radominov ; Serguei A. Shestak ; Jung-Young Son; Holographic transmission-type screens for projection of stereoscopic or multiview color images. Proc. SPIE 3011, Practical Holography XI and Holographic Materials III, 146 (Apr. 10, 1997).*

(Continued)

*Primary Examiner* — Mikhail Itskovich
(74) *Attorney, Agent, or Firm* — Marsh Fischmann & Breyfogle LLP; Kent A. Lembke (57) ABSTRACT

A method for generating three dimensional (3D) displays. The method includes displaying a hologram that combines three (or more) images encoded into three (or more) different OAM channels, and the method also includes reflecting light from the displayed hologram to create a multichannel light beam. Then, the method involves decoding the multichannel light beam to decode and display the three encoded images. The decoding step includes displaying the three encoded images in decoded form in three view zones, three focal planes, or on three spaced-apart planes. The decoding is performed by a single decoding screen using holograms used for generating the three encoded images or is performed by three decoding screens configured based on a differing one of the holograms used for generating the three encoded images. The displaying of the hologram step includes operating a spatial light modulator (SLM) to display the hologram on a screen of the SLM.

20 Claims, 5 Drawing Sheets

(56) References Cited

OTHER PUBLICATIONS

G.C.G. Berkhout, M.P.J. Lavery, J. Courtial, M.W. Beijersbergen, M.J. Padgett, "Efficient Sorting of Orbital Angular Momentum States of Light," Physical Review Letters 105, 153601 (2010) ("Berkhout").*

* cited by examiner

OPTICAL VORTEX 3D DISPLAYS

BACKGROUND

1. Field of the Description

The present invention relates, in general, to autostereoscopic displays, to holography and to holographic displays, and, more particularly, to displays adapted to utilize optical vortices to create three dimensional (3D) displays.

2. Relevant Background

Recently, the demand for 3D displays has rapidly expanded both for theater and similar settings for larger audiences and for smaller applications, such as for home theaters and televisions, with a smaller number of viewers. One approach to providing 3D displays is labeled or named "multi-view 3D displays." In these displays, a set of two dimensional (2D) images is directed into different view zones, which provides different views for each eye at different locations. Multi-view 3D displays are desirable in part because the different views for each eye provide multiple stereo views and 3D parallax. Another approach is the use of so called multi-planar 3D displays. In these displays, a set of 2D images are directed onto different depth layers. Multi-planar 3D displays are desirable in part because they provide 3D depth, parallax, and accommodation cues.

One challenge facing designers and manufacturers of multi-view/multi-planar 3D displays is the mechanism or technique of distributing the 2D images into the different view zones (e.g., into different viewers' eyes) or onto different depths. All eyes or viewers' eyes are essentially identical except for their placement in a view zone (e.g., all are spaced apart about 2.5 inches), and, similarly, projection screens that can be placed apart at different depths in a multi-view 3D display are typically made of the same material. Light intended for different eyes or different screen layers must be accurately and precisely directed only where it is intended for a multi-view/multi-planar 3D display to properly function. This may involve use of temporal multiplexing, directional backlights, spatially multiplexed parallax barriers/lenticulars, and the like. Alternatively, some device has to be utilized to help the eyes and screens discriminate between light intended for them (the eyes or screens) and light intended for others (other eyes or other screens), and such discrimination may be performed using light wavelengths, polarization of the light (e.g., with a viewer wearing special 3D glasses), or synchronized shuttering between an image source and viewers' eyes or a screen.

To better understand challenges of providing 3D displays, it may be informative to examine a related analogy with 3D stereo with colored or polarized glasses. Colored glasses (e.g., anaglyph glasses) and polarized glasses are common devices that are used to help a viewer's eye to discriminate between light intended for that particular eye and light intended for another eye (e.g., for their other eye). In 3D viewing with colored glasses, left and right images are encoded using chromatically opposite colors such as red and cyan, and the glasses have matching colored filters positioned over each of the wearing viewer's eyes. The viewer's brain acts to merge the two different colored images into a single full color image, but sometimes this can result in binocular color rivalry and eye strain. Some glass technologies use two slightly different wavelengths for red, green, and blue for each eye, as the eye is not sensitive to slight color differences. The left and right eyes of the viewer see images of similar color and brightness, which relieves retinal rivalry. However, these glasses are expensive to fabricate as the filters have to be extremely selective to wavelengths that are very close to each other. A further limit of wavelength-based 3D glasses is that some designs only use two sets of wavelengths, which limits their use to two or stereo views.

Polarized glasses similarly help discriminate between views intended for the viewer's left and right eyes. In these 3D systems, left-right images are encoded using oppositely oriented polarized light, and the viewers each wear glasses with matching polarization filters over each eye. The human eye is largely insensitive to polarization so that each eye of a viewer wearing polarized glasses sees images of similar color and brightness. Polarized light is a combination of two polarization directions, e.g., horizontal and vertical. As a result, a limit with the use of polarized light is that a 3D display system designer can only encode two views using only polarization (as is the case with some wavelength-based 3D display systems).

Display systems using color/wavelength and polarized encoding project onto screens. Each screen, being projected upon, sends the encoded light into all directions, and transmission filters placed (by 3D glasses) over each eye act to select the appropriate image for that particular eye. Again, only two polarizations or two sets of wavelengths are needed to discriminate between a viewer's left and right eyes. Such an arrangement is adequate for use in a cinema setting where each viewer does not change their viewpoint. However, for multi-view autostereo displays (i.e., displays where viewers do not wear special eyewear), more than two images must be encoded, and a screen would need to reflect (or bend) light into a different direction based upon the wavelength or polarization. Layer discrimination is also problematic in this regard because it would require a color/wavelength or polarization-selective scattering/transparent screen.

SUMMARY

The inventor recognized that there remained a need for new designs for multi-view 3D displays (or simply "3D displays" or "3D display systems" or, more specifically, "OAM 3D displays" or "optical vortex 3D displays") that presented more than two images or views to an audience or group of viewers. Particularly, the present description teaches 3D displays that are configured to discriminate between light intended for many views or planes (or at least more than two views or planes). The 3D displays were designed using the properties of light for such discrimination, e.g., the amplitude, phase, color, polarization, and/or other properties of the light. This approach allowed the inventor to provide autostereo multi-view 3D displays or multi-layer displays with a single projector and unsynchronized passive screens.

The optical vortex 3D display can be configured to encode light that is projected onto or delivered to a display screen. A screen, which may be labeled a decoding screen, may be included in the system and will be adapted or configured to know what to do with the encoded light, e.g., to know how to demultiplex the light and direct it into differing view zones (or focal planes) or know to display or pass the light to a next screen/layer. In brief, the optical vortex 3D displays can be adapted to provide three or more views/view zones or layers by encoding light in a way that is decodable and demultiplexed by one or more decoding screens.

To this end, the inventor recognized the usefulness of optical vortices in which a wavefront has a spiral phase pattern that spins as it travels. The wavefront of the optical vortex can be encoded according to three or more orthogonal encoding profiles such as to define the twist of the wavefront (e.g., to provide light with more than two separable spiral phase patterns). In this way, one can use optical vortices to encode different information into the light associated with differing view images (e.g., identify each of two, three, or more view images intended for three or more view zones or view layers), project light, and at a different location decode the light into separate views or layers. Stated differently, orbital angular momentum (OAM) multiplexing may be used to support combination of three or more view images or image streams that can later be separated at the display screen/device, and optical vortex and OAM are terms that may be used interchangeably in this description.

The encoded spiral beams of light can be combined into a single combined beam (such as via an array of beam combiners or by multiple encodings on a single spatial light modulator (SLM)) that can be projected or transmitted onto one or more decoding screens that act to separate out and selectively display the view images associated with each of the spiral beams or spiral phase patterns provided by the optical vortices. To this end, a hologram may be used to encode light with the spiral phase patterns, which allows the display system to avoid use of spiral phase plates or other solid/physical elements to create the spiral beams (although these may be used in some embodiments of a 3D display according to the present description). Similarly, holograms (or spiral phase plates) may be used to decode the projected encoded beam such as with the use of one or more holograms, e.g., a decoding hologram screen(s).

More particularly, a 3D display system is provided for generating an optical vortex display visible by viewers without the need for special eyewear. The system includes a display controller providing a set of three or more images and also includes a projector projecting light that is a combination of the three or more images. The display system further includes a screen assembly displaying the three or more images on three or more screens, in three or more view zones to provide an autostereoscopic display, or focusing to three or more focal planes.

In some implementations, the system is a multi-view display, and the screen assembly includes a decoding screen sending the projected light in different directions for display in the three or more view zones. In such implementations, the projected light may include a number of multiplexed beams with differing optical angular momentum (OAM) modes, and each of the OAM modes is associated with one of the three or more images. Further, the three or more images each may be presented using a hologram that encodes one of the three or more images based on one of the OAM modes. In operation, the decoding screen functions to decode the holograms to scatter the projected light into the three or more view zones. To this end, the holograms associated with each of the three or more encoded images can be combined into a single combination hologram on a spatial light modulator (SLM) displaying the single combination hologram, and the projecting light step or functionality may include reflecting collimated light off the SLM while the single combination hologram is displayed.

In some cases, the projected light is made up of an array of beams each associated with a pixel of one of the three or more images and with an OAM mode associated with one of the three or more images. In these cases or implementations of the system, the three or more images each can be provided as an array of pixels using a hologram array encoding pixels of one of the three or more images based on one of the OAM modes. Then, the decoding screen can be adapted to decode the hologram arrays to direct the projected light into the three or more view zones or focused into three or more layers. Further, the holograms can be combined into a single combination hologram, the projector may be a spatial light modulator (SLM) displaying the single combination hologram, and the step or functionality of projecting light may include reflecting collimated light off the SLM while the single combination hologram is displayed.

According to other aspects of the description, the display system may be a multilayer display, and the screen assembly may include a set of spaced apart decoding screens each displaying one of the three or more images. In these systems, the projected light may include a number of multiplexed beams with differing optical angular momentum (OAM) modes, and each of the OAM modes is associated with one of the three or more images. The three or more images can each be presented using a hologram encoding one of the three or more images based on one of the OAM modes, and the decoding screen can be adapted to decode the holograms to scatter the projected light at a specified screen or to allow it to pass unaffected to another of the three or more other screens. Further, the holograms associated with each of the three or more images can be combined into a single combination hologram, the projector can include a spatial light modulator (SLM) displaying the single combination hologram, and the step or functionality of projecting light may include reflecting collimated light off the SLM while the single combination hologram is displayed.

In the multilayer embodiment, the projected light may instead include an array of beams each associated with a pixel of one of the three or more images and with an OAM mode associated with one of the three or more images. In such cases, each of the three or more images can be provided as an array of pixels using a hologram array encoding pixels of one of the three or more images based on one of the OAM modes. Then, the decoding screen may be adapted to decode the hologram arrays to scatter the projected light at a specified screen or to allow it to pass unaffected to another of the three or more other screens. Further, the hologram arrays can be combined into a single combination hologram, the projector can include a spatial light modulator (SLM) displaying the single combination hologram array, and the step or functionality of projecting light may involve reflecting collimated light off the SLM while the single combination hologram is displayed.

According to another aspect of the present description, a method is provided for generating a three dimensional (3D) display. The method includes displaying a hologram that combines three images encoded into three different OAM channels, and the method also includes reflecting light from the displayed hologram to create a multichannel light beam. Then, the method involves decoding the multichannel light beam to decode and display the three encoded images.

In some cases, the decoding step includes displaying the three encoded images in decoded form in three view zones or on three spaced-apart planes. In such cases, the decoding can be performed by a single decoding screen using holograms used for directing the three decoded images, a single decoding screen using holograms used for focusing the three decoded image planes, or three decoding screens configured based on a differing one of the holograms used for generating the three encoded images.

In performing the method, the displaying of the hologram step can include operating a spatial light modulator (SLM) to display the hologram on a screen of the SLM. Then, the reflecting of the light step may involve directing collimated light onto the screen of the SLM. In this or other implementations of the method, the hologram may be a combination of three holograms each encoding one of the three images according to one of three phase profiles defining a unique OAM mode.

According to yet another aspect of the present description, an optical vortex 3D display method is provided that includes encoding first, second, and third images to have first, second, and third OAM modes. In practice, the first OAM mode differs from the second OAM mode and the first and second OAM modes differ from the third OAM mode (i.e., each OAM mode is unique to uniquely encode each image). The method further includes generating a hologram combining the encoded first, second, and third images. Also, the method includes operating a projector to use the generated hologram to output a multiplexed beam including light associated with the encoded first, second, and third images.

This method may include using a decoding screen to decode each of the first, second, and third images in the multiplexed beam and to direct the decoded images into first, second, and third directions, respectively. In another case, this method may include using a decoding screen to decode each of the first, second, and third images in the multiplexed beam and to focus the decoded images into first, second, and third planes, respectively. In other cases, though, the method includes using a first decoding screen to decode and display the first image in the multiplexed beam on a first plane, using a second decoding screen to decode and display the second image in the multiplexed beam on a second plane spaced apart from the first plane, and using a third decoding screen to decode and display the third image in the multiplexed beam on a third plane spaced apart from the first and second planes. In some implementations, the encoding step/process includes generating first, second, and third holograms from the first, second, and third images. In this or other implementations, the projector operating includes displaying the generated hologram on an SLM and reflecting collimated light off of the displayed hologram. The images and encodings may vary in time to generate animated images.

DETAILED DESCRIPTION

Briefly, the present description teaches a 3D display (or optical vortex 3D display or optical vortex 3D display system) that is configured specifically to transition away from displays that utilize or rely upon polarization and wavelength encoding.

The display systems described herein may be implemented by using optical vortices (or OAM) to encode or multiplex multiple view or layer images into a single projection onto a holographic screen. The holographic screen(s) will then discriminate or demultiplex the different images in the single projection based on their OAM mode and either redirect each image into its corresponding direction (e.g., into one of three or more view zones in a multi-view 3D display), focus each image into its corresponding layer (e.g., for a multi-focal 3D display), or pass/scatter each image/layer at a plane corresponding with each of a number of layered screens (e.g., for a multiplanar or multilayer 3D displays).

For a screen to act as a decoding screen in an optical vortex 3D display, the screen has to be able to discriminate between light intended for different views or planes. To this end, the light projected onto the screen is encoded with information, and the screen is adapted to be able to decode the light and act appropriately (treat the light in a predefined manner). Light waves have several intrinsic properties: amplitude, phase, wavelength, and polarization (related to photo spin angular momentum).

Light also possesses orbital angular momentum, which is related to the shape of the wavefront. The light wavefront can be shaped into a helical vortex using spiral phase plates, holographic diffraction gratings with fork dislocations, q-plates, and other devices. The pitch of the vortex (i.e., number of helical twists per wavelength) is called the topological charge and determines the amount of orbital angular momentum. Vortices with different pitches or charges can be combined together or multiplexed into a single beam and later separated/demultiplexed using, for example, holograms that can be the inverses of the encoding grating with fork dislocation. Unlike polarization that is limited to two distinct states/signals, OAM modes are theoretically unbounded. In other words, many different OAM signals may be combined and later separated at or by the display screen(s).

Figure 1:
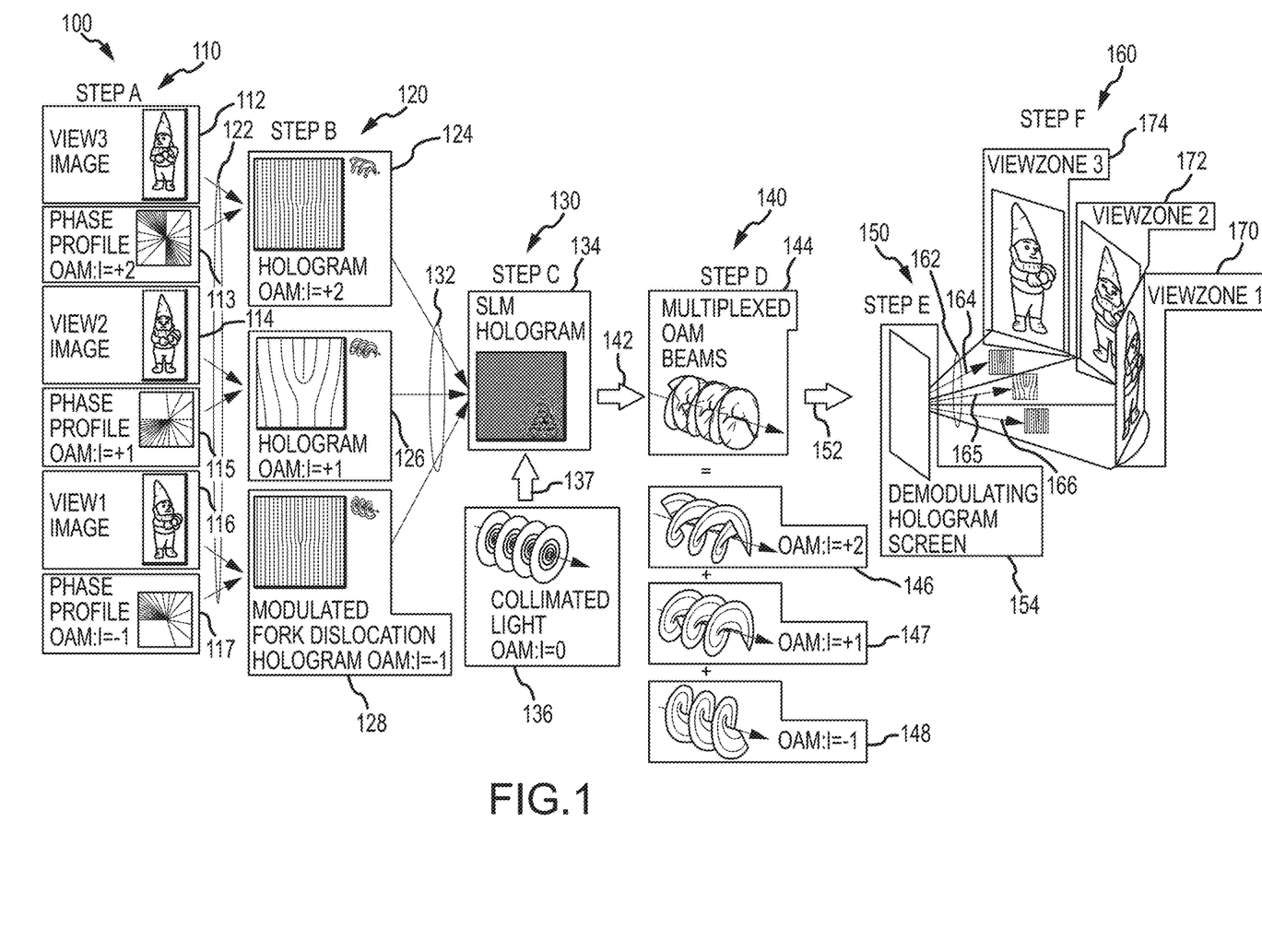
FIG. 1 illustrates schematically components of an optical vortex multi-view display during operation (during performance of a 3D display method) to provide three or more views in different view zones via a decoding screen.

There are several approaches that may be taken to use OAM to multiplex and demultiplex images for 3D displays (which may be multi-view or multilayer displays). FIG. 1 illustrates an optical vortex multi-view display method 100 that may be carried out with the portions of a 3D display system shown. In a first step or Step A shown at 110, a number of images may be encoded into different OAM channels for later multiplexing together. In the example of FIG. 1, three view images 112, 114, 116 (e.g., three or more multi-view images) are provided, e.g., digital images of an object or scene from three differing points of view (POVs). In Step A, each image 112, 114, 116 is assigned or paired with a different OAM channel according to unique phase profiles as shown at 113, 115, 117 corresponding to a double twist, a single twist in that same/first direction, and a single twist in the opposite/second direction, respectively.

Then, in Step B as shown at 120 the output 122 of the first step 110 may be further processed to create three holograms 124, 126, 128. Each of the images 112, 114, 116 is multiplied by a diffractive grating with the appropriate fork dislocation for a desired topological charge as defined by phase profiles 113, 115, 117. As a result, each hologram 124, 126, 128 generates a different topological charge or OAM mode.

Next, as shown in the method 100 of FIG. 1, the output 132 of Step B is processed in Step C at 130 by adding together the individual holograms or encoded images 124, 126, 128 to form a single hologram 134 for display with a projector/display device. In FIG. 1, the hologram 134 is shown as an SLM hologram because, in many implementations of the display method 100, an SLM (e.g., a spatial light modulator in the form of an LCOS (liquid crystal on silicon) device, a DMD (digital micromirror device), or the like) is used or controlled to display the computer generated hologram 134. This may involve, as shown in Step C or step 130 in FIG. 1, operating a collimated light source 136 to provide a collimated beam 137 that is reflected off the SLM while it is displaying or being operated according to the single hologram 134.

As shown in Step D at 140, the output 142 from the SLM and its hologram 134 provides a beam 144 with multiple OAM channels 146, 147, 148 or the beam 144 may be labeled "multiplexed OAM beams" as shown in FIG. 1. In Step E at 150, the beam 144 is projected 152 onto a screen 154, which may take the form of a decoding hologram screen, and the screen 154 may be implemented in various forms depending upon the type of 3D display desired. For a multi-view display as shown in FIG. 1 in Step F at 160, the screen 154 may be a thick hologram created by interfering each OAM beam of a given topological charge with a collimated beam of a different angle of incidence.

When the encoded multichannel OAM beam 144 is projected 152 to impinge on the thick hologram of decoding hologram screen 154, the output 162 of the screen 154 is made up of each of the images 164, 165, 166, which are redirected as shown according to their previous OAM channel into different directions or into three different view zones 170, 172, 174 (e.g., at perpendicular to the plane of screen 154 and two offset angles from the perpendicular). Hence, the display method 100 displays a 3D image to a viewer(s) without the need for special glasses and with three views. Three views are shown in FIG. 1 (and other figures) to illustrate the displays taught provide 3 or more views/layers, and it will be understood that other embodiments may have 4, 5, 6 or more (e.g., 3-10 or more) views/layers. Other embodiments may use encoding and decoding schemes, such as using non-consecutive OAM modes, to reduce cross-talk between encoded and decoded images and OAM channels.

Figure 2:
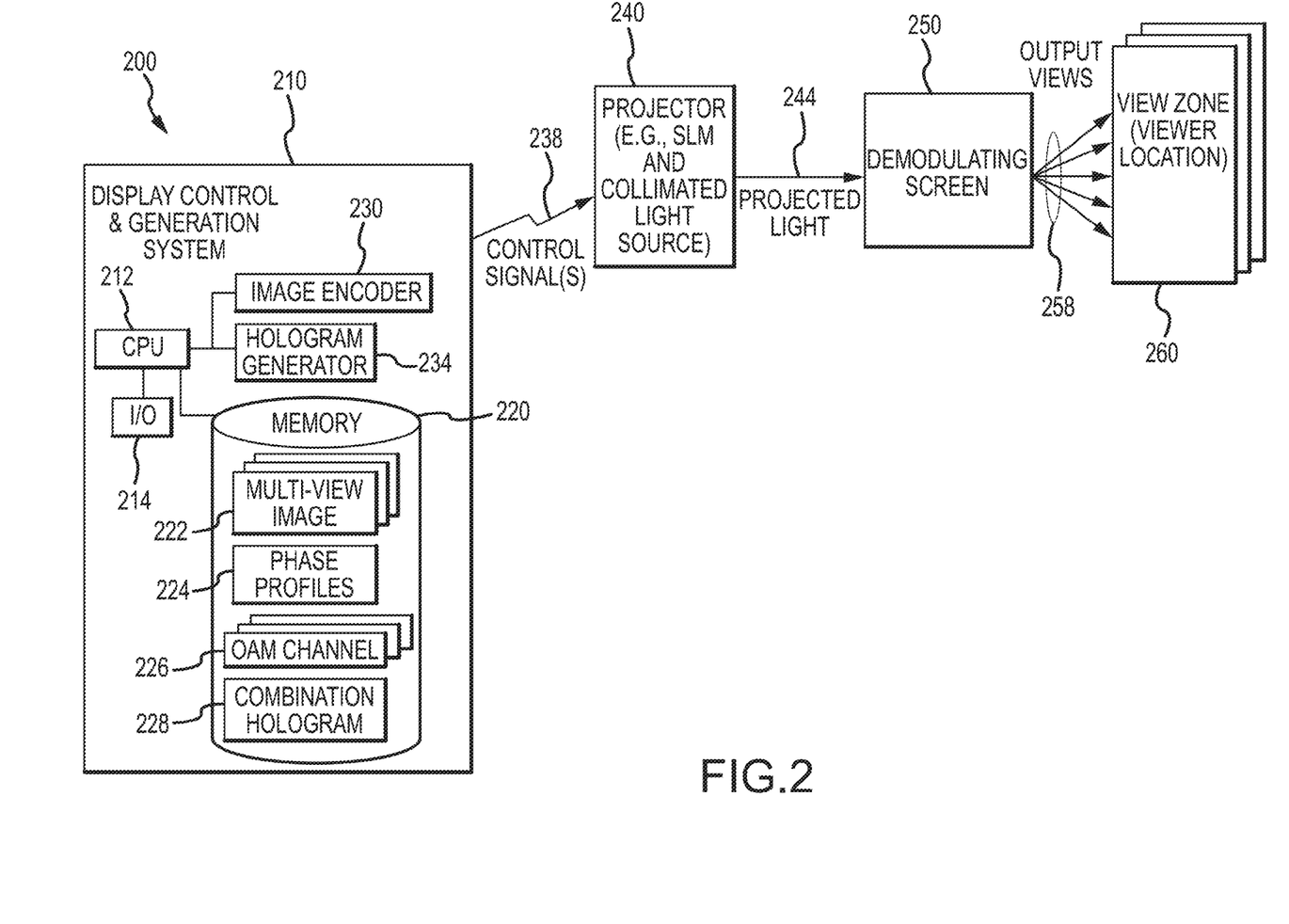
FIG. 2 is a functional block diagram of a 3D display system that may be used to provide the optical vortex display processes discussed herein such as those shown in FIGS. 1 and 3-5.

FIG. 2 illustrates an optical vortex 3D display (or display system) 200 that may be used to implement the display techniques taught in this description including the method 100 of FIG. 1. The system 200 includes a display control and image generation system 210, a projector/display device 240, and a decoding screen(s) 250. The control/generation system 210 includes a processor 212 and input/output devices 214, such as a keyboard, a mouse, a touchscreen, and the like. The processor 212 manages operation of the I/O devices 214 such as to allow a user to initiate image encoding and hologram generation with modules 230 and 234 and to select multi-view images 222 for combining (how many views or layers are to be displayed, what is the image/video stream to be combined for display, and so on) and phase profiles 224 for use in encoding each of the selected images 222.

The processor 212 also executes code (e.g., computer programs stored in computer readable media that when executed by the processor 212 cause the system 210 to perform the 3D display functions described) to provide an image encoder 230 and a hologram generator 234. The processor 210 manages memory devices 220 (or accesses digital data in memory via wired or wireless communications over a communications network). For example, the memory 220 is used to store a number of multi-view images 222 that may be encoded for projection as a single beam/stream of light onto a decoding screen 250 via projector/display device 240. An operator, for example, may select all or a subset of the multi-view images (or image streams, with these terms being interchangeable in this description as the display often will be a still 3D display as well as a 3D video display) for combining using optical vortices or OAM modes.

To this end, the control system 210 may also select a number of default phase profiles 224, which each define a different twist for a wavefront, or a user may be prompted to input these profiles 224 or select them from a list/set of possible phase profiles. Then, during operation of the system 200, the image encoder 230 acts to generate OAM channels 226 by encoding each of the selected multi-view images 222 using an assigned or paired phase profile 224 (e.g., amount of twist in one of a first or a second direction). Next, during operation of the system, the hologram generator 234 acts to combine the OAM channels or individual holograms 226 created by encoder 230 based on the images 222 and phase profiles 224. The individual holograms/OAM channels 226 are combined by generator 234 so as to form a single or combination hologram 228.

Then, as shown at 238, the control system 210 may operate to transmit control signals 238 to cause the projector/display device 240 to generate or project a single light beam 244 onto a screen 250. The projector/display device 240 may take the form of an SLM combined with a light source such as a source of collimated light (e.g., a laser). In operation of the system 200, the projector/display device 240 may respond to control signals 238 by displaying the combination hologram 228 and projecting light onto the hologram to output light beam 244. The projected light 244 is directed onto a decoding screen or layered/spaced apart screens 250. The projected light 244 may be a single multichannel light beam containing OAM beams associated with each of the multi-view (or multi-layer) images 222.

When the display system 200 is implemented as a multi-view display as shown, the decoding screen 250 is configured to send each OAM encoded view 258 into a different direction or view zone 260. When the display system 200 is implemented as a multi-layer display, a number of screens 250 matching the number of views 222 and OAM channels 226 are provided in a spaced apart and layered manner (e.g., screen 250 is in a differing plane) to display three or more images 222 in three or more spaced apart planes or layers (e.g., the view zones 260 are replaced by view planes/layers 260 viewable without the need for 3D eyewear).

Figure 3:
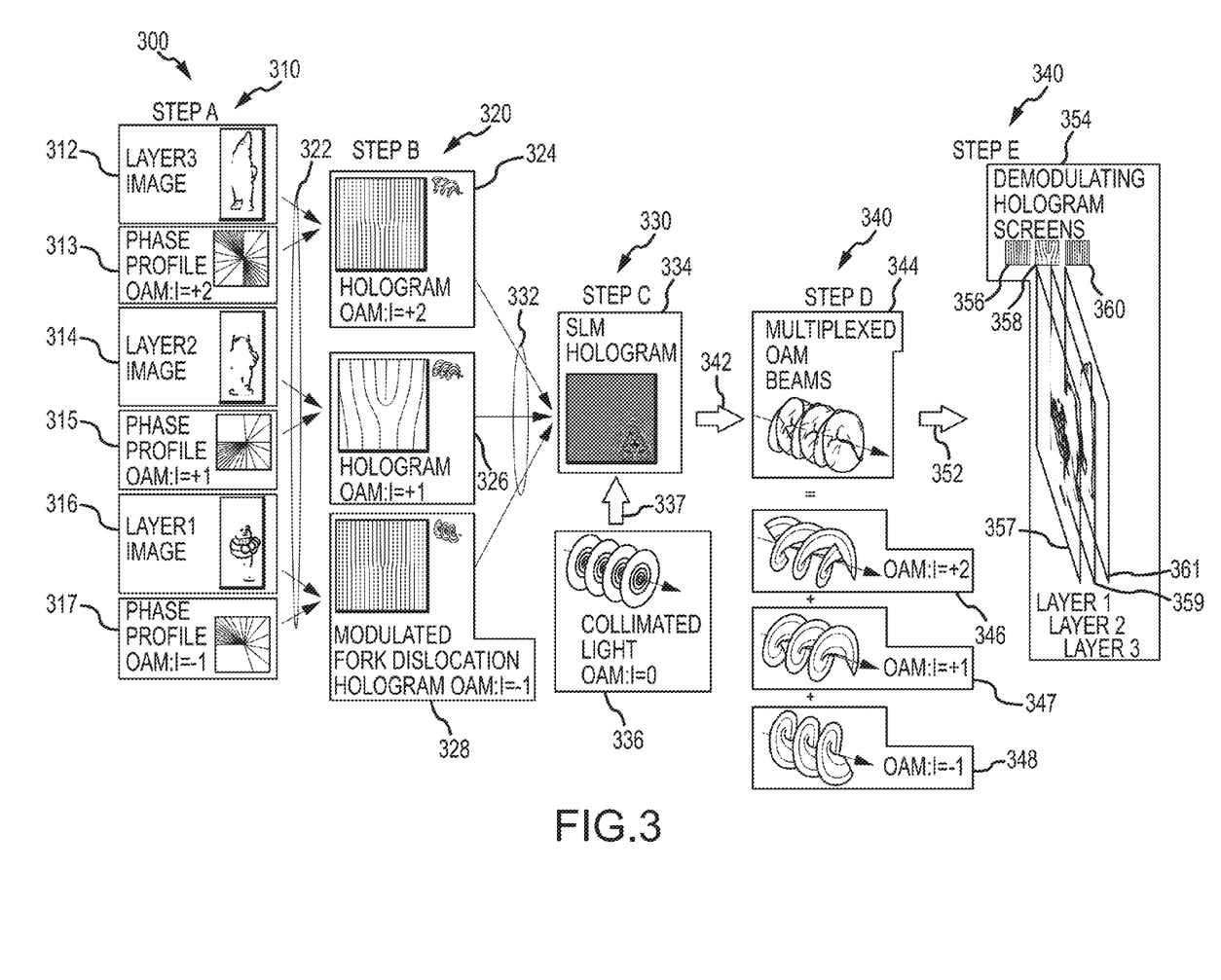
FIG. 3 is a schematic or functional illustration of components of an optical vortex multilayer display during operation (during performance of a 3D display method) to provide a 3D displayed image with three or more layers through the use of three or more decoding screens.

As discussed above, there are several approaches that may be taken to use OAM to multiplex and demultiplex images for 3D displays. FIG. 3 illustrates an optical vortex multi-layer display method 300 that may be carried out with the portions of a 3D display system shown (many of which may be present/used in the method 100, too). In a first step or Step A shown at 310, a number of images may be encoded into different OAM channels for later multiplexing together. In the example of FIG. 3, three layer images 312, 314, 316 (e.g., three or more multi-layer images) are provided such as in the form of digital images of layers or portions of an object or scene that are to be displayed n differing planes or layers (which may be 0 to 6 inches or more apart from each other to achieve a desired amount of depth or volume for a displayed object or scene). In Step A, each image 312, 314, 316 is assigned or paired with a different OAM channel according to unique phase profiles as shown at 313, 315, 317 corresponding to a double twist, a single twist in that same/first direction, and a single twist in the opposite/second direction, respectively.

Then, in Step B as shown at 320 the output 322 of the first step 310 may be further processed to create three holograms 324, 326, 328. Specifically, each of the images 312, 314, 316 are multiplied by a diffractive grating with the appropriate fork dislocation for a desired topological charge as defined by phase profiles 313, 315, 317. As a result, each hologram 324, 326, 328 has a different topological charge. Steps A and B may be thought of as providing a plurality of encoded images (or individual image holograms), and these steps may be performed by an "image source" such as the display controller and/or image generation system 210 of system 200 of FIG. 2.

Next, as shown in the method 300 of FIG. 3, the output 332 of Step B is processed in Step C at 330 by adding together the individual holograms or encoded images 324, 326, 328 to form a single hologram 334 for display with a projector/display device (note, this step may also be formed by the "image source" such as system 210 of FIG. 2). In FIG. 3, the hologram 334 is shown as an SLM hologram because in many implementations of the display method 300 an SLM is used or controlled to display the computer generated hologram 334. This may involve, as shown in Step C or step 330 in FIG. 3, operating a light source 336 to provide a collimated beam 337 that is reflected off the SLM while it is displaying or being operated according to the single hologram 334. As shown in Step D at 340, the output 342 from the SLM and its hologram 334 provides a beam 344 with multiple OAM channels 346, 347, 348 or the beam 344 may be labeled "multiplexed OAM beams" as shown in FIG. 3.

In contrast to method 100 of FIG. 1, the method 300 is performed to provide a multilayer display or to display an image or imagery made up of portions presented in spaced apart planes. To this end, the method 300 includes a Step 3 in which the projected beam 352 is directed onto a decoding screen assembly 354. The assembly 354 includes multiple, stacked (but typically spaced apart at least a small distance) demultiplexing or decoding hologram screens 357, 359, 361.

Significantly, each screen 357, 359, 361 is adapted to only scatter one OAM mode and pass the rest of OAM channels 346, 347, 348. Each screen 357, 359, 361 may be provided as a thick hologram, as shown with differing holograms 356, 358, 360. The holograms 356, 358, 360 may be created by interfering a single OAM beam of a single given topological charge with a diffuse beam. When the encoded multichannel OAM beam 344 impinges (as shown with arrow 352) on each thick hologram 356, 358, 360 of screens/projection layers 357, 359, 361 the image 312, 314, 316 corresponding to the OAM channel (or mode or topological charge) of that hologram 356, 358, 360 will be scattered at that screen/layer 357, 359, 361. The remaining light with the remaining OAM channels and associated images will pass through unaltered. The remaining channels will be decoded on their respective planes/layers 359 or 361 by corresponding thick holograms 358 or 360 tuned to the appropriate OAM topological charge or OAM channel.

When the encoded multichannel OAM beam 344 is projected 352 to impinge on the thick hologram of decoding hologram screen 354, the output of the screen 354 is made up of each of the images 356, 358, 360 carried by the OAM channels, which are redirected as shown into different directions or into three different view layers 357, 359, 361 (e.g., perpendicular to the plane of screen 354 and two offset angles from perpendicular). Hence, the display method 300 displays a 3D image to a viewer(s) without the need for special glasses and with three layers. Three views are shown in FIG. 1 (and other figures) to illustrate the displays taught provide 3 or more views/layers, and it will be understood that other embodiments may have 4, 5, 6 or more (e.g., 3-10 or more) views/layers.

The methods 100 and 300 of FIGS. 1 and 3 and the corresponding system 200 of FIG. 2 could also be implemented by providing an image carrying planar wave. For example, a collimated beam may be reflected off a LCOS/DMD or through an LCD panel. The image carrying planar wave may be passed through a spiral wave plate, which imparts a desired topological charge. Multiple beams with different encoded images can then be combined together in this display method (and corresponding optical vortex 3D display) such as through the use of a beam combiner (e.g., a half-silver mirror or the like).

Figure 4:
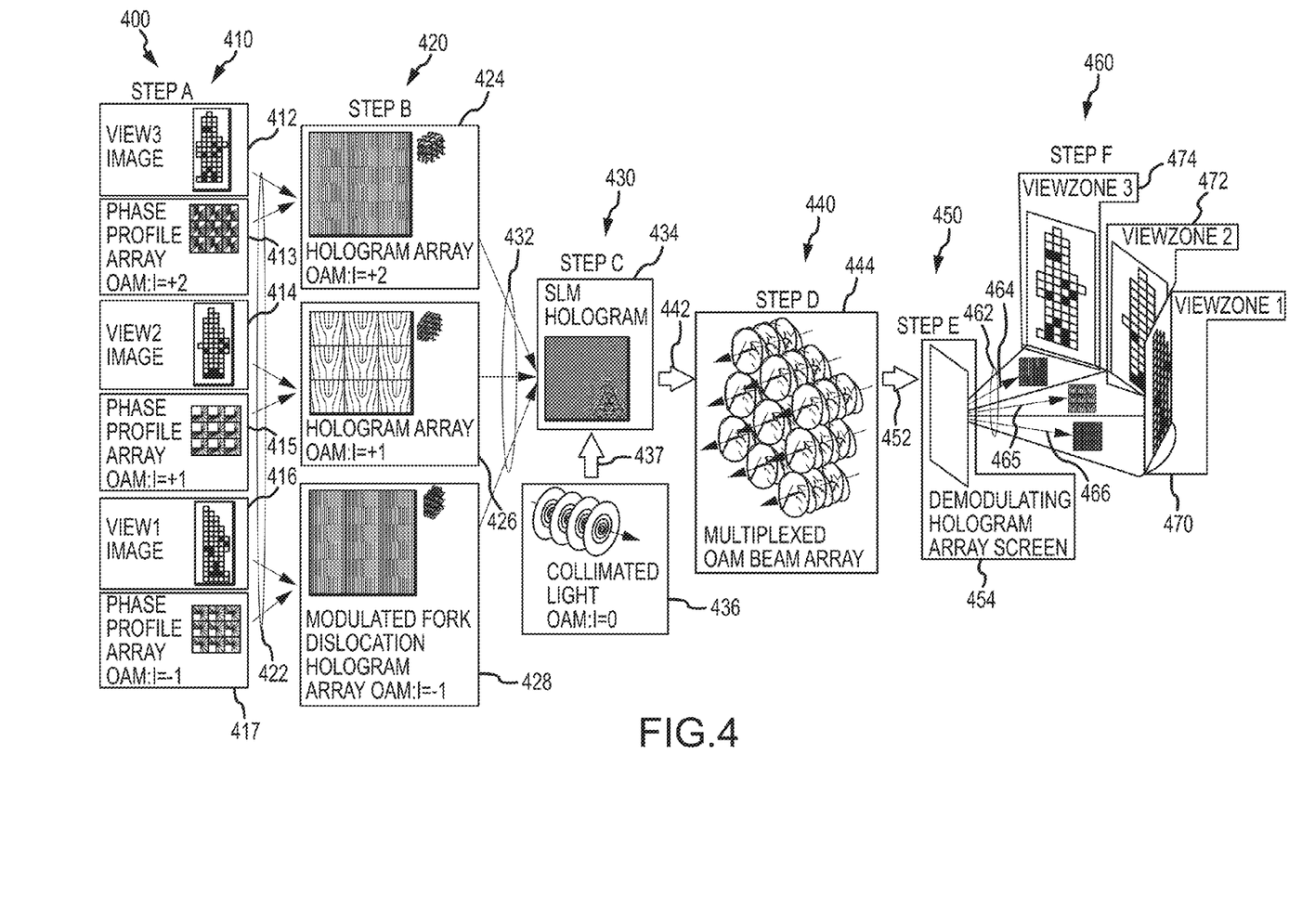
FIG. 4 is a schematic or functional illustration of components of an optical vortex multi-view pixelated display during operation (during performance of a 3D display method) to provide three or more views in different view zones via a decoding screen.

FIG. 4 illustrates an optical vortex multi-view pixelated display method 400. As shown at 410 in Step A (as compared with Step A in methods 100 and 300), each multi-view image 412, 414, 416 may be composed of an array of pixels or may be pixelated. Differing phase profile arrays may be assigned to these images as shown at 413, 415, and 417 such that each of the images is made up of "vortex pixels" all with the same OAM charge or twist.

In Step B at 420, the output 422 (i.e., the images 412, 414, 416 are encoded into different OAM channels 413, 415, 417) of Step A is used to form individual holograms 424, 426, 428 that each look like an array of diffraction gratings with the same fork dislocation. Vortex pixels would be modulated in intensity/efficiency by the brightnesses of the corresponding pixels in the desired image. Different images would have vortex pixels of different OAM topological charges. Step B may be described as encoding the images 412, 414, 416 into different OAM channels with each channel being an array of encoded pixels of the same OAM topological charge.

Then, as shown at 430 in Step C, the output 432 of Step B or the individual holograms 424, 426, 428 are combined into a single hologram 434 that may be displayed on an SLM or other "projector," that is activated by reflecting a collimated beam 437 from a light source 436. The final hologram 434 is a sum of all the different vortex pixel images. In Step D as shown at 440, the output 442 of Step C provides an array 444 of multichannel light beams that in Step E at 450 are projected as shown by arrow 452 onto a decoding screen (e.g., a decoding hologram array screen) 454. The array 444 is made up of multiplexed beams with multiple OAM channels.

As shown at 460 in Step F, the decoding hologram array screen 454 sends at 462 the pixels 464, 465, 466 into differing directions or view zones 470, 472, 474 based on the OAM encodings. The screen 454 may be varied to suit the particular display method. For a multi-view pixelated display method 400, the screen 454 is a thick hologram with an array of the holograms 424, 426, 428 produced in Step B at 420. Each vortex pixel of the multiplexed beam 444 impinges 452 on a demultiplexing hologram array element in hologram array screen 454 to be directed 462 into differing view zones 470, 472, 474. Alternatively, the pixels could be focused to different depth(s) based upon their previous OAM encodings.

Figure 5:
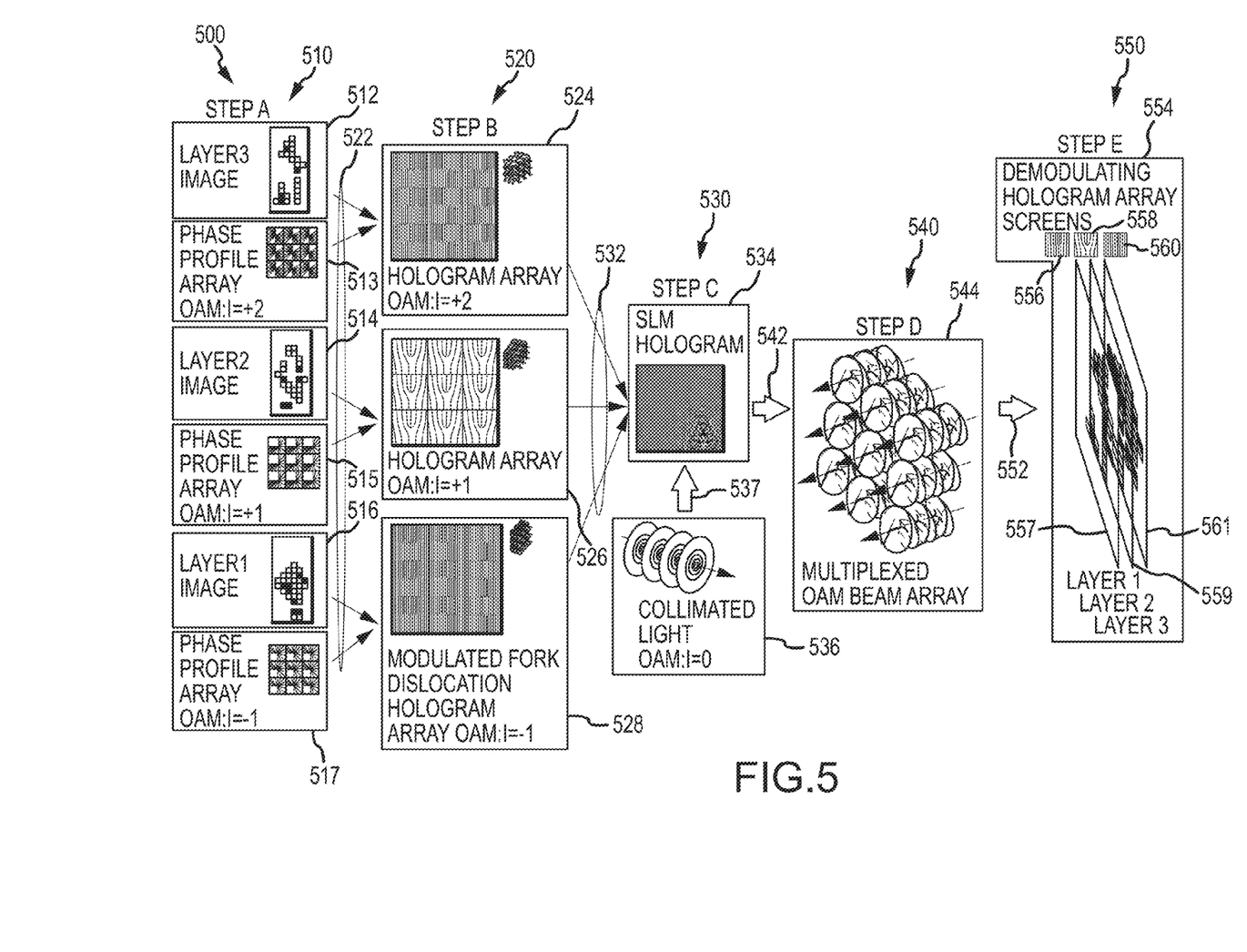
FIG. 5 a schematic or functional illustration of components of an optical vortex multilayer pixelated display during operation (during performance of a 3D display method) to provide a 3D displayed image with three or more layers through the use of three or more decoding screens.

FIG. 5 illustrates an optical vortex multilayer pixelated display method 500. As shown at 510 in Step A, each multilayer image 512, 514, 516 may be composed of an array of pixels or may be pixelated, with each array associated with a portion of an image of an object or scene to be displayed on a plane/layer of a screen assembly 554. Differing phase profile arrays may be assigned to these images as shown at 513, 515, and 517 such that each of the images is made up of "vortex pixels" all with the same OAM charge or twist.

In Step B at 520, the output 522 (i.e., the images 512, 514, 516 are encoded into different OAM channels 513, 515, 517) of Step A is used to form individual holograms 524, 526, 528 that each look like an array of diffraction gratings with the same fork dislocation. Vortex pixels would be modulated in intensity/efficiency by the brightness of the corresponding pixels in the desired image. Different images would have vortex pixels of different OAM topological charges. Step B may be described as encoding the images 512, 514, 516 into different OAM channels with each channel being an array of encoded pixels of the same OAM topological charge.

Then, as shown at 530 in Step C, the output 532 of Step B or the individual holograms 524, 526, 528 are combined into a single hologram 534 that may be displayed on an SLM or other "projector," that is activated by reflecting a collimated beam 537 from a light source 536. The final hologram 534 is a sum of all the different vortex pixel images. In Step D as shown at 540, the output 542 of Step C provides an array 544 of multichannel light beams that in Step E at 550 are projected as shown by arrow 552 onto a decoding screen assembly (e.g., a set of decoding hologram array screens with a number matching the number of layer images 512, 514, 516). The array 544 is made up of multiplexed beams with multiple OAM channels.

As shown at 550 in Step F, the assembly or stack 554 receives as shown with arrow 552 the OAM beam array 544. The array 544 is made up of a stack of spaced apart layers or screens 557, 559, 561 each configured according to a differing hologram 556, 558, 560 (i.e. each corresponds to one of the holograms 524, 526, 528). As can be seen, the method 500 tracks Steps A-D of method 400, but the method 500 differs with regard to Step E as shown at 550.

Each layer 557, 559, 561 is configured to demodulate one OAM channel (as defined by phase profiles 513, 515, 517) so that the appropriate encoded layer of pixels are scattered or displayed on the corresponding layer/plane of screen 557, 559, or 561. Each screen 557, 559, 561 may be provided as a thick hologram as shown at 556, 558, 560 with an array of the holograms 524, 526, 528 produced in Step B as shown at 520. Each vortex pixel of the multiplexed beam 544 impinges 552 on a demultiplexing hologram array element in one of the screens 557, 559, 561 provided in three stacked layers in assembly 554.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, some of the examples shown were used to encode three images using optical vortex techniques, but three images were used only to illustrate that the methods are useful for combining at least three images that can be displayed in three layers/planes or three differing view zones (directed in three directions from a decoding screen). In some implementations, though, 4 to 10 or more images may be encoded using the methods and systems described herein and then displayed in 4 to 10 or more view zones or on 4 to 10 or more layers/planes. Alternate schemes to encode the images into each OAM mode may be used to reduce the cross-talk between nodes. The OAM nodes may be spaced or non-consecutive so as to reduce cross-talk between the modes.

The optical vortex 3D displays and methods provide a number of advantages over prior multiplexing and display techniques. Temporal encoding requires synchronization between the projector and screen, and high speed projection is also required. Spatial multiplexing reduces resolution and requires fine alignment for projection of subpixels behind lenslets. Additionally, blow by and space requirements limit the number of screen layers in such displays. Angular multiplexing requires multiple projectors and a large optic. Wavelength multiplexing is expensive due to the color filter (e.g., two sets of colors), and costs would increase for even narrower wavelength discrimination (e.g., more color sets equals more views or layers). This technique also involves a need to match mixed colors created from different color sets. Polarization multiplexing only supports two components or views (unless combined with spatial multiplexing). Virtual planes between the two physical scattering planes can be created but with a reduction in the field of view and with a limitation that the planes are not independent.

In contrast, the optical vortex 3D displays (and associated display methods) use OAM multiplexing and demultiplexing using a single projector and a single passive screen (or passive screen assembly in a multi-layer embodiment). No synchronization or high speed projection is required. The number of OAM channels is not limited to two and is ideally unbounded at all. Hence, many or multiple view zones or layers are addressable with a single projector.

I claim:

1. A display system, comprising:
 a display controller providing a set of three or more images;
 a projector projecting a light beam that is a combination of the three or more images; and
 a screen assembly displaying the three or more images on three or more screens positioned at three or more differing focal planes or in three or more view zones to provide an autostereoscopic display,
 wherein the projected light beam comprises a number of multiplexed beams each associated with a differing optical angular momentum (OAM) mode,
 wherein each of the multiplexed beams has a wavefront shaped as a helical vortex with a pitch differing from other ones of the multiplexed beams,
 wherein each of the OAM modes is associated with a differing one of the three or more images,
 wherein the projector comprises a spatial light modulator (SLM) displaying a combination computer-generated hologram,
 wherein the combination computer-generated hologram is formed by combining a set of computer-generated holograms each representing one of the three or more images, and
 wherein the projector further includes a light source directing a collimated light beam onto the SLM during the displaying of the combination computer-generated hologram thereby producing the projected light beam.

2. The system of claim 1, wherein the display system is a multi-view display and the screen assembly comprises a decoding screen scattering the projected light in different directions for display in the three or more view zones.

3. The system of claim 2, wherein the decoding screen decodes the holograms to direct the projected light into the three or more view zones.

4. The system of claim 2, wherein the projected light comprises an array of beams each associated with a pixel of one of the three or more images and with an OAM associated with one of the three or more images.

5. The system of claim 4, wherein the three or more images each is provided as an array of pixels using a hologram array encoding pixels of one of the three or more images based on one of the OAM modes and wherein the decoding screen decodes the hologram arrays to scatter the projected light into the three or more view zones.

6. The system of claim 5, wherein the hologram are combined into a single combination hologram, wherein the projector comprises a spatial light modulator (SLM) displaying the single combination hologram, and wherein the projecting light comprises reflecting collimated light off the SLM while the single combination hologram is displayed.

7. The system of claim 1, wherein the display system is a multilayer display and the screen assembly comprises a set of spaced apart decoding screens each displaying one of the three or more images.

8. The system of claim 1, wherein the decoding screens decode the holograms to scatter the projected light onto the three or more screens.

9. The system of claim 1, wherein the decoding screens decode the holograms to focus the projected light into the three or more focal planes.

10. The system of claim 7, wherein each of the three or more images is provided as an array of pixels using a hologram array encoding pixels of one of the three or more images based on one of the OAM modes and wherein the decoding screens decode the hologram arrays to scatter the projected light into the three or more focal planes.

11. The system of claim 7, wherein the projected light comprises an array of beams each associated with a pixel of one of the three or more images and with an OAM mode associated with one of the three or more images.

12. The system of claim 11, wherein each of the three or more images is provided as an array of pixels using a hologram array encoding pixels of one of the three or more images based on one of the OAM modes and wherein the decoding screen decodes the hologram arrays to focus the projected light into the three or more layers.

13. A method of generating a three dimensional (3D) display, comprising:
displaying a hologram that combines three computer-generated holograms formed from three images encoded into three different OAM channels, wherein the three computer-generated holograms are formed by multiplying the three images with a fork dislocation for a topological charge defined by a phase profile defining a unique OAM mode;
reflecting light from the displayed hologram to create a multichannel light beam; and
decoding the multichannel light beam to decode and display the three encoded images.

14. The method of claim 13, wherein the decoding comprises displaying the three encoded images in decoded form in three view zones or on three spaced-apart planes.

15. The method of claim 14, wherein the decoding is performed by a single decoding screen using holograms used for generating the three encoded images or is performed by three decoding screens configured based on a differing one of the holograms used for generating the three encoded images.

16. The method of claim 13, wherein the displaying of the hologram comprises operating a spatial light modulator (SLM) to display the hologram on a screen of the SLM and wherein the reflecting of the light comprises directing collimated light onto the screen of the SLM.

17. An optical vortex 3D display method, comprising:
encoding first, second, and third images to have first, second, and third OAM modes, wherein the first OAM mode differs from the second OAM mode and the first and second OAM modes differ from the third OAM mode and wherein the encoding comprises generating first, second, and third computer-generated holograms from the first, second, and third images based on first, second, and third phase profiles, respectively, defining differing amounts of twist of a wavefront in one of a first or a second direction;
generating a hologram combining the encoded first, second, and third images; and
operating a projector to use the generated hologram to output a multiplexed beam including light associated with the encoded first, second, and third images.

18. The method of claim 17, further comprising using a decoding screen to decode or demultiplex each of the first, second, and third images in the multiplexed beam and to direct the decoded images into first, second, and third directions, respectively.

19. The method of claim 17, further comprising using a first decoding screen to decode or demultiplex and to display the first image in the multiplexed beam on a first plane, using a second decoding screen to decode or demultiplex and to display the second image in the multiplexed beam on a second plane spaced apart from the first plane, and using a third decoding screen to decode or demultiplex and to display the third image in the multiplexed beam on a third plane spaced apart from the first and second planes.

20. The method of claim 17, wherein the operating of the projector comprises displaying the generated hologram on an SLM and reflecting collimated light off of the displayed hologram.

* * * * *